Nov. 25, 1924.
W. H. PRATT
1,516,785
VEHICLE RADIATOR CURTAIN
Filed May 28, 1923   2 Sheets-Sheet 1
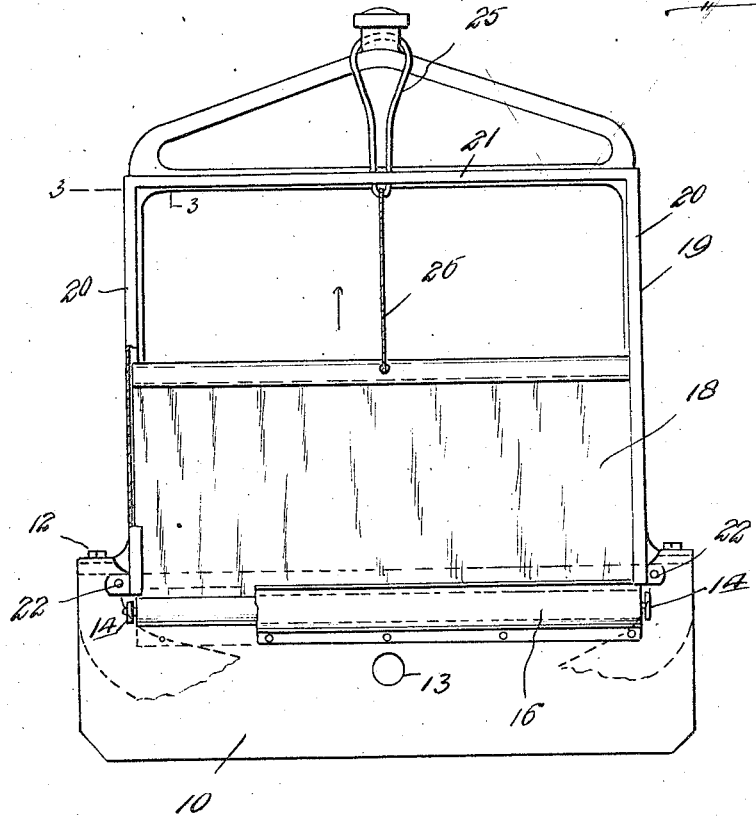
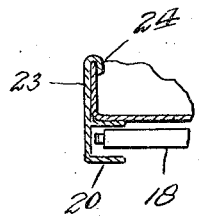
W. H. Pratt,
Inventor

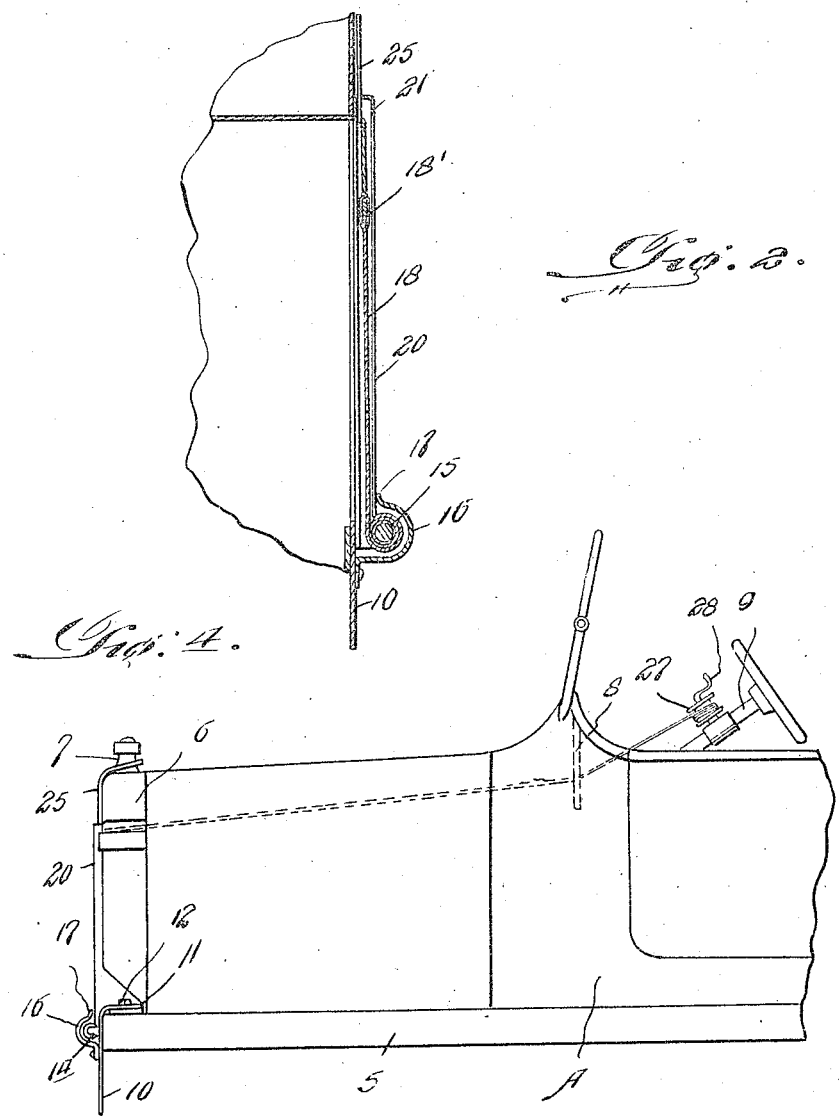

Patented Nov. 25, 1924.

1,516,785

UNITED STATES PATENT OFFICE.

WILLIAM H. PRATT, OF CUMMINSVILLE, NEBRASKA.

VEHICLE RADIATOR CURTAIN.

Application filed May 26, 1923. Serial No. 641,823.

*To all whom it may concern:*

Be it known that I, WILLIAM H. PRATT, a citizen of the United States, residing at Cumminsville, in the county of Wheeler and State of Nebraska, have invented certain new and useful Improvements in Vehicle Radiator Curtains, of which the following is a specification.

In carrying out the present invention, it is my purpose to provide a curtain for the radiators of vehicles, wherein these radiators may be partially or totally covered in cold weather for thereby limiting or entirely cutting off the air supply to the radiator for preventing freezing of the water therein.

The primary object of this invention is the provision of a curtain of a form somewhat similar to the usual house window curtains, the same being associated with novel guide and supporting means that are associated with the vehicle radiator and frame bars.

A further object of my invention is the provision of such a curtain for vehicle radiators that may be applied thereto in a novel, simple and expeditious manner, the invention being further characterized by the fact that it may be manufactured and marketed at small cost.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1—is a front elevation of a motor vehicle, certain elements thereof being removed and equipped with my improved curtain, a portion of the guide frame being shown in cross section.

Figure 2—is a fragmentary detail vertical cross section of Figure 1.

Figure 3—is a detail section taken upon the line 3—3 of Figure 1, and

Figure 4—is a side elevation of the front end of the machine equipped with my improved curtain.

Referring to the drawings in detail, the vehicle designated A includes the usual frame bars 5, radiator 6, filling spout 7, instrument board 8 and steering post 9, these elements being of course found on practically all types of automobiles and are not of the essence of my invention, the same being merely shown for permitting of the more adequate disclosure of the relationship of my invention therewith.

My invention per se, embodies the provision of a metallic skirt or plate that extends across the front end of the machine, and is pendent from the frame bars 5, the upper side of this skirt or plate being equipped at opposite ends with rearwardly directed extensions 11 that are bolted or otherwise suitably secured at 12 to the said frame bars 5. It is necessary that this skirt or plate 10 be provided with a central opening 13 for permitting of the engagement of the crank handle therethrough for obvious purposes.

Adjacent opposite ends of the plate 10 there is provided forwardly extending shade brackets 14 that receive respectively the usual projecting pintles of a spring shade roller 15. In position over the shade roller 15 and extending longitudinally across the plate or skirt 10 and secured thereto is a metallic cover 16, the upper edge thereof being slightly curved inwardly at 17 and is in close relationship with the curtain 18 of the roller 15 for reducing to a minimum the liability of the entrance of dirt, water or other foreign matter within said cover.

In position upon the front of the radiator 6 is an open channel guide frame 19, of substantially inverted U-shape, the same comprising side channel bars 20 and an upper connecting channel bar 21. The lower ends of the channel bars 20 are provided with outwardly directed lugs 22, that are secured through the medium of bolts, rivets or the like to the plate or skirt element 10. These channel bars 20 are in vertical alinement with the opposite ends of the curtain roller 15, and are adapted for slidably receiving therebetween the opposite edges of said curtain 18, this curtain being provided at its free end with the usual cross wooden strip 18'.

Adjacent the upper end of the channel bars 20—20, the same are formed with rearwardly directed extensions 23, that have close contact with the adjacent sides of the usual shell of the radiator 6, the ends of these extensions being bent inwardly at 24 for engagement around the edges of the said radiator shell for providing an additional means for securing said guide frame 19 in position.

In detachable engagement with the filler spout 7 of the radiator 6 is a pendent cord guide 25 of wire and of a shape preferably as shown in Figures 1 and 4. Attached to the end of the curtain 18 carrying the cross strip 18' is one end of a cord 26 that extends upwardly and engages through the said wire guide 25 and then through one of the usual openings in the radiator, this cord being directed rearwardly beneath the vehicle hood and thence through an opening in said instrument board 8.

Disposed upon the steering post 9 of the vehicle in any manner desirable is a relatively small cable drum 27, equipped with an operating handle 28, and to which is secured the opposite end of the cord 26. In view of the above description, it will at once be apparent that whenever it is desired to raise the curtain 18 to cover the radiator 6, the handle 28 of the drum 27 may be rotated for consequently winding the cord 26 thereon. A winding of this cord will obviously effect a raising of the curtain, and a winding of the usual spring within the roller 15. By releasing the handle 28, the curtain will be wound upon the roller and out of position in front of the radiator.

Numerous advantages of a device of this character will be readily appreciated by those skilled in the art, and even though I have herein shown and described the preferred embodiment of the present invention, it is nevertheless to be understood that minor changes may be made therein when desired as fall within the scope of what is claimed.

Having thus described my invention, what I claim as new, and desire to secure by Letters-Patent, is:

In combination with an automobile radiator, a rewinding roller journalled at the lower end to the frame thereof, a curtain sheet arranged to wind upon the roller and adapted to move vertically along the front of the radiator, an elongated loop member loosely hung upon the filling tube of the radiator and having its lower portion disposed along the front side of the top portion of the frame and extending below the lower edge of the said top portion of the frame, and a cord connected at one end with the free end portion of the curtain and trained through the lower portion of the said loop member, and through the core of the radiator.

In testimony whereof I affix my signature.

WILLIAM H. PRATT.